US011321973B2

(12) United States Patent
Zaccherini et al.

(10) Patent No.: US 11,321,973 B2
(45) Date of Patent: May 3, 2022

(54) METHOD AND SYSTEM OF VEHICLE DIAGNOSTICS

(71) Applicant: Tweddle Group, Inc., Clinton Township, MI (US)

(72) Inventors: Sergio Zaccherini, Bloomfield Hills, MI (US); Ilya Sterin, Grosse Pointe Farms, MI (US); Ryan Pike, Novi, MI (US)

(73) Assignee: Tweddle Group, Inc., Clinton Township, MI (US)

( * ) Notice: Subject to any disclaimer, the term of this patent is extended or adjusted under 35 U.S.C. 154(b) by 218 days.

(21) Appl. No.: 16/480,225

(22) PCT Filed: Jan. 22, 2018

(86) PCT No.: PCT/US2018/014731
§ 371 (c)(1),
(2) Date: Jul. 23, 2019

(87) PCT Pub. No.: WO2018/140361
PCT Pub. Date: Aug. 2, 2018

(65) Prior Publication Data
US 2020/0005563 A1 Jan. 2, 2020

Related U.S. Application Data

(60) Provisional application No. 62/449,827, filed on Jan. 24, 2017.

(51) Int. Cl.
*G07C 5/08* (2006.01)
*G07C 5/00* (2006.01)

(52) U.S. Cl.
CPC ........... *G07C 5/0808* (2013.01); *G07C 5/008* (2013.01); *G07C 5/0825* (2013.01); *G07C 2205/02* (2013.01)

(58) Field of Classification Search
CPC .... G07C 5/0808; G07C 5/008; G07C 5/0825; G07C 2205/02; G07C 5/12; G05B 23/0248; G05B 23/0272
See application file for complete search history.

(56) References Cited

U.S. PATENT DOCUMENTS

2006/0271256 A1   11/2006   Siebel et al.
2007/0233341 A1   10/2007   Logsdon
(Continued)

FOREIGN PATENT DOCUMENTS

WO   WO-2012148514 A1   11/2012

OTHER PUBLICATIONS

European Search Report dated Sep. 25, 2020, relating to EP Application No. 18745452.
(Continued)

*Primary Examiner* — Michael V Kerrigan
(74) *Attorney, Agent, or Firm* — Honigman LLP

(57) ABSTRACT

A method for vehicle diagnostics includes receiving vehicle information from a vehicle computer system and identifying, at the data processing hardware, at least one vehicle module from the vehicle information. The at least one vehicle module represents a detected fault of the vehicle computer system. The method also includes executing a diagnostic program configured to display on a display screen a graphical user interface having a fault topology window associated with at least one detected fault of the at least one vehicle module. The fault topology window has a vehicle information panel and a fault topology view panel. The diagnostic program is configured to receive a detected fault selection input of the at least one detected fault of the at least one vehicle module and display a fault topology view of the at least one detected fault of the at least one vehicle module.

20 Claims, 11 Drawing Sheets

(56) References Cited

U.S. PATENT DOCUMENTS

| | | |
|---|---|---|
| 2010/0306588 A1 | 12/2010 | Hamilton et al. |
| 2012/0259587 A1 | 10/2012 | Sannino et al. |
| 2013/0226393 A1 | 8/2013 | Julson et al. |
| 2014/0075362 A1 | 3/2014 | Gray et al. |
| 2014/0100738 A1 | 4/2014 | Itatsu et al. |
| 2015/0121275 A1 | 4/2015 | Marshall et al. |
| 2019/0130670 A1* | 5/2019 | Takao .................. G06Q 10/20 |

OTHER PUBLICATIONS

International Search Report dated May 2, 2018, relating to International Application No. PCT/US2018/014731.

* cited by examiner

METHOD AND SYSTEM OF VEHICLE DIAGNOSTICS

TECHNICAL FIELD

This disclosure relates to a method and a system for vehicle diagnostics.

BACKGROUND

This section provides background information related to the present disclosure and is not necessarily prior art.

As technology has generally progressed, so too have modern vehicles. Modern vehicles, such as cars, trucks, motorcycles, planes, buses, and other conveyance mechanisms, have shifted from complex mechanical machines to—perhaps even more complex—electro-mechanical machines. With this electro-mechanical shift vehicles include one or more complex electronic networks. For example, a common electronic network that has become the standard for some car vehicle manufacturers is known as a Controller Area Network (CAN). CAN, like other electronic networks, originally developed as a more effective way to monitor vehicle emission control systems. CAN, along with other electronic networks, brought standardization to On-Board Diagnostics by connecting engine sensors to a network for self-diagnosis. On-Board Diagnostic tools, such as the current second generation OBD-II, read a vehicle's broadcasted alpha numeric codes corresponding to a wide range of vehicle system faults. Yet today, electronic networks in vehicles have expanded beyond merely vehicle emission control systems to a system of wires and software communicating with various computers and sensors. The various computers or electronic control units (ECUs) sense and command modules throughout the vehicle to enable a more advanced level of interaction for an operator, a manufacturer, or a diagnostician. The implementation of electronic networks in vehicles can bring substantial benefits such as consumer cost savings, increased vehicle reliability, and enhanced feature programming. But the substantial benefits can also yield increased electronic complexity and diagnostic capabilities. A diagnostician may now acquire a substantial volume of vehicle information regarding a vehicle computer system and the many vehicle modules associated with the vehicle computer system.

SUMMARY

One aspect of the disclosure provides a method for vehicle diagnostics. The method includes receiving, at data processing hardware, vehicle information from a vehicle computer system and identifying, at the data processing hardware, at least one vehicle module from the vehicle information. The at least one vehicle module represents a detected fault of the vehicle computer system. The method also includes executing, at the data processing hardware, a diagnostic program configured to display on a display screen in communication with the data processing hardware a graphical user interface having a fault topology window associated with at least one detected fault of the at least one vehicle module. The fault topology window has a vehicle information panel and a fault topology view panel. The diagnostic program is configured to receive, in the fault topology window, a detected fault selection input of the at least one detected fault of the at least one vehicle module and display, in the graphical user interface, a fault topology view of the at least one detected fault of the at least one vehicle module.

Implementations of the disclosure may include one or more of the following optional features. In some implementations, receiving vehicle information from a vehicle computer system includes integrating the vehicle information with a test configuration program. The test configuration program may have at least one of a collection of vehicle connections or a collection of vehicle components based on the received vehicle information. The fault topology view may include a harness topology view, a pinout topology view, or a vehicle topology view.

In some examples, the diagnostic program is configured to receive, in the fault topology window, a fault topology view selection and display, in the fault topology window, the fault topology view associated with the fault topology view selection. The diagnostic program may be further configured as follows: to receive, in the fault topology window, a fault topology view selection; to display, in the fault topology window, the fault topology view associated with the fault topology view selection; and to display, in the fault topology window, a detected fault list. The diagnostic program may also be configured as follows: to compare the detected fault of the detected fault list corresponding to the detected fault selection input to a fault database; to display, in the fault topology window, a verification list of at least one of the detected fault connections or the detected fault components associated with the detected fault selection input; and to order, in the fault topology window, the verification list of at least one of the detected fault connections or the detected fault components by the respective fault frequency of each detected fault connection of the collection of detected fault connections and each detected fault component of the collection of detected fault components. The fault database may include at least one of a collection of detected fault connections or a collection of detected fault components. Each detected fault connection of the collection of detected fault connections and each detected fault component of the collection of detected fault components may have a fault frequency.

In some examples, the diagnostic program is configured to display a detected fault list in the graphical user interface. The diagnostic program may also be configured to compare the detected fault of the detected fault list corresponding to the detected fault selection input to a fault database, display, in the fault topology window, a verification list of at least one of the detected fault connections or the detected fault components associated with the detected fault selection input, and order, in the fault topology window, the verification list of at least one of the detected fault connections or the detected fault components by the respective fault frequency of each detected fault connection of the collection of detected fault connections and each detected fault component of the collection of detected fault components. The fault database may include at least one of a collection of detected fault connections or a collection of detected fault components. Each detected fault connection of the collection of detected fault connections and each detected fault component of the collection of detected fault components may have a fault frequency.

Another aspect of the disclosure provides a system for vehicle diagnostics. The system includes data processing hardware and memory hardware in communication with the data processing hardware. The memory hardware stores instructions that when executed on the data processing hardware cause the data processing hardware to perform operations. The operations include receiving vehicle information from a vehicle computer system, identifying at least one vehicle module from the vehicle information, and executing a diagnostic program configured to display on a display screen a graphical user interface having a fault topology window associated with at least one detected fault of the at least one vehicle module. The at least one vehicle module represents a detected fault of the vehicle computer system. The fault topology window has a vehicle information panel and a fault topology view panel. The diagnostic program is configured to receive, in the fault topology window, a detected fault selection input of the at least one detected fault of the at least one vehicle module and display, in the graphical user interface, the fault topology view of the at least one detected fault of the at least one vehicle module.

This aspect may include one or more of the following optional features. In some implementations, receiving vehicle information from a vehicle computer system includes integrating the vehicle information with a test configuration program. The test configuration program may have at least one of a collection of vehicle connections or a collection of vehicle components based on the received vehicle information. The fault topology view may include a harness topology view, a pinout topology view, or a vehicle topology view.

In some examples, the diagnostic program is configured to receive, in the fault topology window, a fault topology view selection and display, in the fault topology window, the fault topology view associated with the fault topology view selection. The diagnostic program may also be configured to display a detected fault list in the graphical user interface.

In some implementations, the diagnostic program is configured to compare the detected fault of the detected fault list corresponding to the detected fault selection input to a fault database, display, in the fault topology window, a verification list of at least one of the detected fault connections or the detected fault components associated with the detected fault selection input, and order, in the fault topology window, the verification list of at least one of the detected fault connections or the detected fault components by the respective fault frequency of each detected fault connection of the collection of detected fault connections and each detected fault component of the collection of detected fault components. The fault database may include at least one of a collection of detected fault connections or a collection of detected fault components. Each detected fault connection of the collection of detected fault connections and each detected fault component of the collection of detected fault components may have a fault frequency.

Yet another aspect of the disclosure provides a user device including a display screen, data processing hardware in communication with the display, and memory hardware in communication with the data processing hardware. The memory hardware stores instructions that when executed on the data processing hardware cause the data processing hardware to perform operations. The operations include receiving vehicle information from a vehicle computer system, identifying at least one vehicle module from the vehicle information, and executing a diagnostic program configured to display on a display screen a graphical user interface having a fault topology window associated with at least one detected fault of the at least one vehicle module. The fault topology window has a vehicle information panel and a fault topology view panel. The diagnostic program is configured to receive, in the fault topology window, a detected fault selection input of the at least one detected fault of the at least one vehicle module and display, in the graphical user interface, the fault topology view of the at least one detected fault of the at least one vehicle module.

This aspect may include one or more of the following optional features. In some implementations, receiving vehicle information from a vehicle computer system includes integrating the vehicle information with a test configuration program. The test configuration program may have at least one of a collection of vehicle connections or a collection of vehicle components based on the received vehicle information. The fault topology view may include a harness topology view, a pinout topology view, or a vehicle topology view.

In some examples, the diagnostic program is configured to receive, in the fault topology window, a fault topology view selection and display, in the fault topology window, the fault topology view associated with the fault topology view selection. The diagnostic program may be configured to display a detected fault list in the graphical user interface.

In some implementations, the diagnostic program is further configured to compare the detected fault of the detected fault list corresponding to the detected fault selection input to a fault database, display, in the fault topology window, a verification list of at least one of the detected fault connections or the detected fault components associated with the detected fault selection input, and order, in the fault topology window, the verification list of at least one of the detected fault connections or the detected fault components by the respective fault frequency of each detected fault connection of the collection of detected fault connections and each detected fault component of the collection of detected fault components. The fault database may include at least one of a collection of detected fault connections or a collection of detected fault components. Each detected fault connection of the collection of detected fault connections and each detected fault component of the collection of detected fault components may have a fault frequency.

In some configurations, the diagnostic program is further configured to determine to the fault frequency by generating a multigraph as a model of circuitry for the vehicle based on the vehicle information, determining circuitry of the multigraph corresponding to the detected fault of the vehicle computer system, determining, for the multigraph, a centrality weight by a graph centrality corresponding to the at least one vehicle module representing the detected fault, determining a proximity weight for each detected fault connection and each detected fault component related to the detected fault, and identifying the fault frequency as a weight based on at least one of the centrality weight or the proximity weight.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
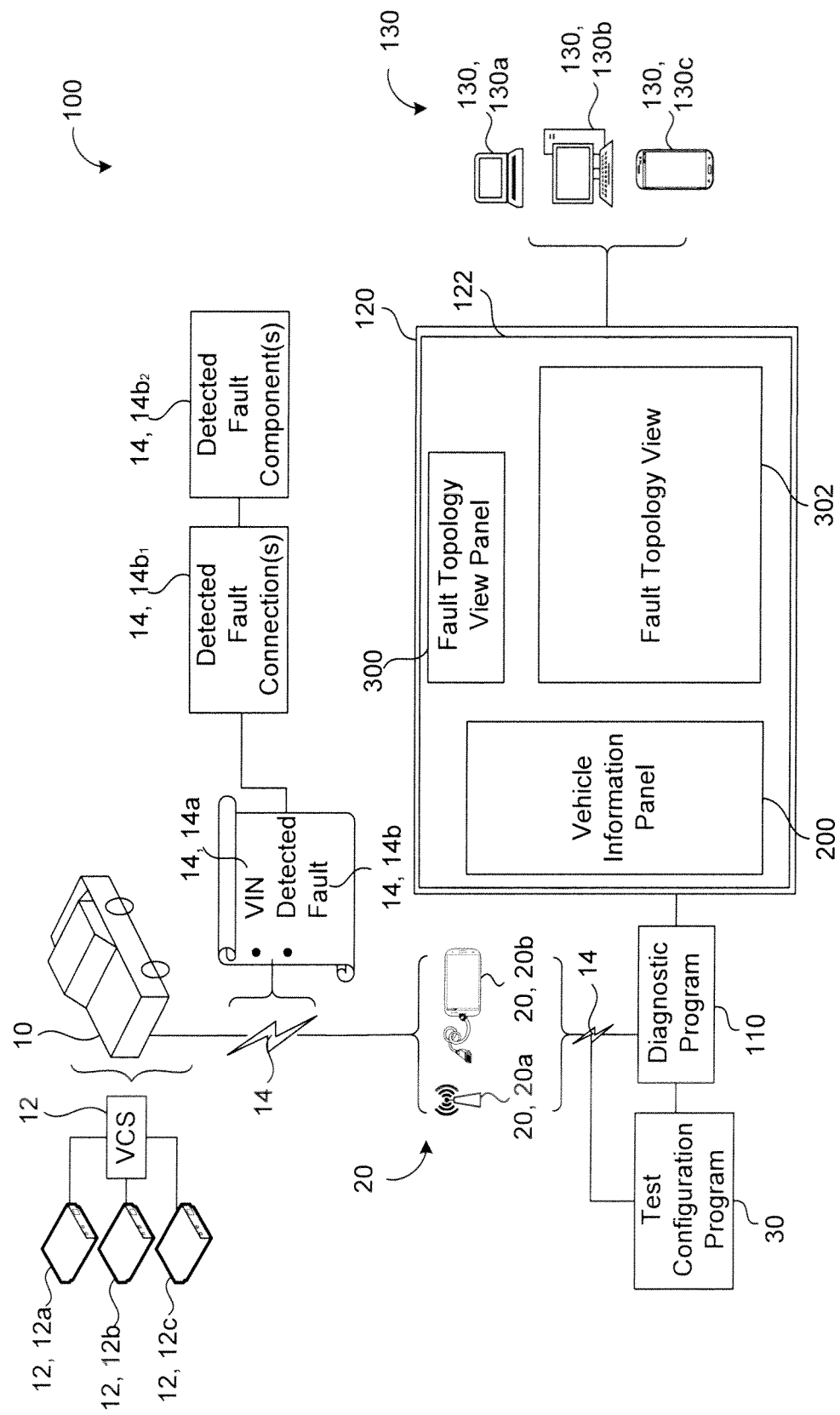
FIG. 1 is a schematic view of an example of a diagnostic user environment.

FIG. 1 is an example of a diagnostic user environment 100. The diagnostic user environment 100 includes a vehicle 10 with a vehicle computer system 12, or VCS. The vehicle computer system 12 communicates vehicle information 14 to a vehicle interface 20. The vehicle interface 20 relays the vehicle information 14 to a diagnostic program 110 to configure a graphical user interface 120 on a display screen 130. The graphical user interface 120 includes a fault topology window 122 with at least a vehicle information panel 200 and a fault topology view panel 300.

Generally, this disclosure relates to a method, a topology, and a graphical user interface system for architecture failure modes of vehicles and application diagnostics. For simplicity, this disclosure describes and illustrates a vehicle 10 and systems of a vehicle 10 with reference to a motorized vehicle, such as a car. Yet a skilled artisan would appreciate that a car and the systems of a car are merely illustrative for purposes of this disclosure. A "vehicle" refers more broadly to something used for transporting people or goods, such as a truck, a car, a motorcycle, a plane, a bus, a blimp, a shopping cart, or any conveyance mechanism. As such, the systems and/or methods of vehicle diagnostics herein described with respect to a car may be translated to any vehicle system within the spirit of this disclosure.

In some implementations, the vehicle 10 is a motorized vehicle, such as a car or a truck that includes a diagnostic port. The diagnostic port may be any communication port on the vehicle 10 such as, for example, an OBD-II port with a diagnostic connector. The diagnostic port is configured to enable the vehicle computer system 12 to communicate with the vehicle interface 20. Generally, each type of motorized vehicle has a vehicle system signal protocol (e.g., CAN-BUS, VPW, KWP2000, or PWM).

In some examples, the vehicle system signal protocol of the vehicle 10 relays vehicle information 14 from the vehicle computer system 12 of the vehicle 10 to a vehicle interface 20 that connects to the diagnostic port. The vehicle computer system 12 includes one or more electronic control units, or ECUs. Each ECU monitors and senses different vehicle modules 12, 12*a-n* of the vehicle 10. The vehicle 10 may include as little as a few vehicle modules 12, 12*a-n* or as many as several dozen vehicle modules 12, 12*a-n* depending on the manufacturer of the vehicle 10 and the type of the vehicle 10. The number of vehicle modules, n, depends on how the electrical system of the vehicle 10 is configured. Often the number of vehicle modules 12, 12*a-n* may vary by year, make, model, and even option package for the vehicle 10. In cases where the vehicle 10 may include a few vehicle modules 12, 12*a-n*, the vehicle 10 includes at least an engine control module 12, 12*a* (also referred to as a powertrain module) and a transmission control module 12, 12*b*. Often in such cases, the vehicle 10 also includes a body control module 12, 12*c* and/or a chassis control module. Some vehicles 10 may include safety modules, airbag modules, anti-theft modules, cruise control modules, steering modules, instrument cluster modules, lighting modules, suspension modules, transfer case modules (e.g., 4WD), vehicle assistance modules, HVAC modules, stability control modules, and/or other electrical accessory modules.

Alternatively or additionally, the vehicle 10 may combine or divide vehicle modules 12, 12*a-n*. For example, the body control module 12, 12*c* may incorporate such vehicle modules 12, 12*a-n* as HVAC modules, lighting modules, safety modules, or anti-theft modules, as a few examples, or may configure the body control module to only account for one electrical system (e.g., HVAC). Each vehicle module 12, 12*n* of the vehicle computer system 12 may broadcast vehicle information 14 relating to the status of electrical components and electrical connections configured for the vehicle 10.

Referring further to FIG. 1, the vehicle interface 20 receives the vehicle information 14 broadcasted by at least one vehicle module 12, 12*n* of the vehicle computer system 12. The vehicle information 14 includes at least a vehicle identification number 14, 14*a* (VIN), and a detected fault 14, 14*b* from at least one vehicle module 12, 12*n*. The vehicle information 14 may also include powertrain information (e.g., engine speed, cylinder misfire, transmission shift points, or ignition voltage), sensor data (e.g., sensor temperature, sensor pressures, or sensor voltages), driving parameters (e.g., driving time or driving distance), or other vehicle computer system information. The vehicle interface 20 identifies the detected fault 14, 14*b* from at least one vehicle module 12, 12*n* and outputs the vehicle information 14 with the detected fault 14, 14*b*. In some examples, the detected fault 14, 14*b* may be a diagnostic trouble code, or DTC. The detected fault 14, 14*b* may also be an errant parameter from at least one vehicle module 12, 12*n* of the vehicle computer system 12.

An example of a vehicle interface 20 is a diagnostic tool such as an OBD-II scanner. The diagnostic tool may be any device configured to connect or to communicate via the diagnostic port of the vehicle 10. The vehicle interface 20 may be a wireless diagnostic tool 20, 20*a* (e.g., Bluetooth or Wi-Fi adapter) or a wired diagnostic tool 20, 20*b* (e.g., handheld OBD-II scanner). In some instances, the vehicle interface 20 includes a device configured to receive the signal of the wireless diagnostic tool 20, 20*a*, such as a PC, a laptop, a tablet, or a mobile device.

Additionally or alternatively, the vehicle interface 20 may be a network analyzer. The network analyzer may measure a reflection or a transmission across the vehicle computer system 12. The diagnostic program 110 may be configured to receive the measurement of the network analyzer and to associate the measurement with at least one detected fault 14, 14*b* from at least one vehicle module 12, 12*n* of the vehicle 10.

In some examples, the vehicle interface 20 outputs the vehicle information 14 to a test configuration program 30. The test configuration program 30 integrates the vehicle information 14 with at least one of a collection of vehicle connections, circuits, and/or components based on the received vehicle information 14. A vehicle connection may be a port, a plug, a socket, a terminal block, a binding post, or a similar means of coupling electrical components. As some examples, vehicle connections or circuits may be included in wiring harnesses, sensors, relays, or fuses. In some examples, the test configuration program 30 includes a database of vehicle connections, circuits, or components. The test configuration program 30 may further include a protocol that pairs the received vehicle information 14 with the related vehicle connections, circuits, or components of the database of vehicle connections, circuits, or components. The test configuration program 30 may perform the pairing by the VIN 14, 14a of the vehicle 10 or by the vehicle module 12, 12n with the detected fault 14, 14b. As an example, the test configuration program 30 includes each vehicle connection, each circuit, or each component corresponding to each vehicle module 12, 12n for the vehicle 10.

Additionally or alternatively, the vehicle interface 20 outputs the vehicle information 14 directly to the diagnostic program 110 configured to display the graphical user interface 120 on the display screen 130. The graphical user interface 120 includes a fault topology window 122 associated with at least one detected fault 14, 14b of the at least one vehicle module 12, 12n. The diagnostic program 110 identifies at least one vehicle module 12, 12n representing the detected fault 14, 14b of the vehicle computer system 12. From the vehicle module 12, 12n representing the detected fault 14, 14b of the vehicle computer system 12, the diagnostic program 110 can identify at least one of a collection of detected fault connections 14, $14b_1$ or a collection of detected fault components 14, $14b_2$. The collection of detected fault connections 14, $14b_1$ and the collection of detected fault components 14, $14b_2$ corresponds to vehicle connections or vehicle components of the vehicle module 12, 12n with the detected fault 14, and 14b. The collection of detected fault connections 14, $14b_1$ and the collection of detected fault components 14, $14b_2$ are not necessarily faulty components and faulty connections, but rather connections and components associated with the detected fault to aid in troubleshooting the detected fault 14, 14b. For example, the vehicle 10 may have a diagnostic trouble code (DTC) for an anti-lock braking system (ABS) as the detected fault 14, 14b. The diagnostic program 110 identifies connections and components for the anti-lock braking system relating to the DTC for the vehicle 10. The identified collection of detected fault connections 14, $14b_1$ and the collection of fault components 14, $14b_2$ may be an ABS computer, ABS relays, speed sensors, calipers, brake lines, rotors or discs, a hydraulic dampener, or the brake pedal assembly. The diagnostic program 110 may be more or less inclusive for the collection of detected fault connections 14, $14b_1$ and the collection of detected fault components 14, $14b_2$ corresponding to vehicle connections or vehicle components of the vehicle module 12, 12n with the detected fault 14, 14b depending on the specificity of the vehicle information 14 or the detected fault 14, 14b.

In some implementations, the graphical user interface 120 has a fault topology window 122 associated with at least one detected fault 14, 14b of the at least one vehicle module 12, 12n. The fault topology window 122 includes panels and views, such as at least the vehicle information panel 200, the fault topology view panel 300, and a fault topology view 302. A diagnostician interacts with the graphical user interface 120 by selecting detected faults 14, 14b and viewing the graphical user interface 120 as the graphical user interface 120 displays the fault topology view 302 associated with each selected detected fault 14, 14b.

Referring further to FIG. 1, the display screen 130 displays the graphical user interface 120. In some examples, the display screen 130 receives display instructions from the diagnostic program 110 as data processing hardware executes the diagnostic program 110. The display screen 130 may be a laptop 130, 130a, a PC 130, 130b, a mobile device 130, 130c (e.g., tablet or mobile phone), or any other device capable of graphical display.

Figure 2A:
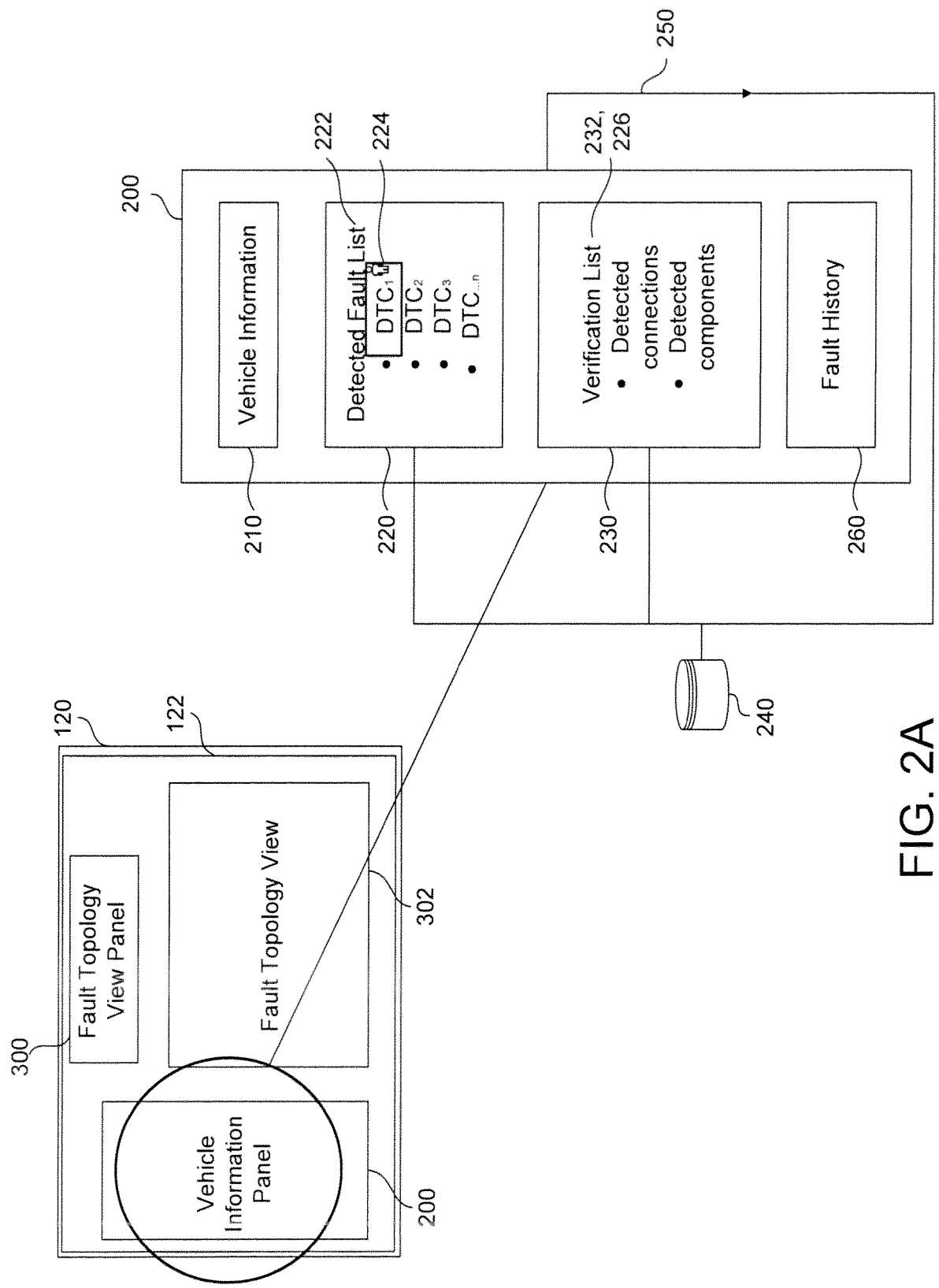
FIG. 2A is a schematic view of an example of a graphical user interface including a vehicle information panel.

FIG. 2A is an example of the vehicle information panel 200. The vehicle information panel 200 may include sections that display the vehicle information 14 of the vehicle 10. In some examples, the vehicle information panel 200 includes at least one of a detected fault list section 220, a vehicle information section 210, a verification list section 230, or a fault history section 260. The vehicle information section 210 includes vehicle information 14 from the vehicle 10. The vehicle information 14 from the vehicle 10 included in the vehicle information section 210 may be the VIN 14, 14a or other vehicle parameters input by the diagnostician, such as owner information or vehicle mileage. The vehicle information section 210 may also include portions of the VIN 14, 14a deciphered by the diagnostic program 110 or other program (e.g., the test configuration program 30), such as vehicle manufacturer, vehicle attributes, model year, or plant of manufacture. The vehicle information panel 200 also includes the detected fault list section 220. The detected fault list section 220 is where the diagnostic program 110 displays a detected fault list 222 in the fault topology window 122 of the graphic user interface 120. The detected fault list 222 includes a list of at least one detected fault 14, 14b of the vehicle computer system 12. For example, FIG. 2A depicts that the detected fault list 222 is a list of DTCs. Alternatively or additionally, the detected fault list 222 may be a list of any detected fault 14, 14b such as an errant parameter from at least one vehicle module 12, 12n of the vehicle computer system 12.

Referring further to FIG. 2A, at least one detected fault 14, 14b within the detected fault list 222 may be selectable such that the diagnostic program 110 receives a detected fault selection input 224 corresponding to a detected fault 14, 14b within the detected fault list 222. When the diagnostic program 110 receives the detected fault selection input 224, the diagnostic program 110 displays, in the graphical user interface 120, the fault topology view 302 of the detected fault 14, 14b corresponding to the detected fault selection input 224.

In some examples, when the diagnostic program 110 receives the detected fault selection input 224, the diagnostic program 110 is configured to display a verification list 232 in the verification list section 230 of the vehicle information panel 200. The verification list 232 includes detected fault connections 14, $14b_1$ and detected fault components 14, $14b_2$ associated with the detected fault 14, 14b of the detected fault selection input 224. The diagnostic program 110 may also be configured to order, in the fault topology window 122, the verification list 232 of at least one of the detected fault connections 14, $14b_1$ or the detected fault components 14, $14b_2$ by a fault frequency 226 corresponding to each detected fault connection 14, $14b_1$ and each detected fault component 14, $14b_2$ related to the detected fault 14, 14b of the detected fault selection input 224. To order the verification list 232, the diagnostic program 110 compares the detected fault 14, 14b of the detected fault list 222 corresponding to the detected fault selection input 224 to a fault database 240. The fault database 240 includes at least one of a collection of detected fault connections 14, $14b_1$ or a collection of detected fault components 14, $14b_2$. Each detected fault connection 14, $14b_1$ of the collection of detected fault connections 14, $14b_1$ and each detected fault component 14, $14b_2$ of the collection of detected fault components 14, $14b_2$ has a respective fault frequency 226. The fault database 240 may be a database of the diagnostic program 110, a database associated with the test configuration program 30, or a database on a server accessed by a network. The diagnostician may also update the fault database 240 with a feedback response 250. The feedback response 250 may include an actual fault of the vehicle 10. The feedback response 250 would update the fault frequency 226 of fault database 240 according to the actual fault of the vehicle 10. For example, as a feedback response 250, the graphic user interface 120 is configured to allow the diagnostician to submit a faulty component, circuit, or connection to the fault database 240 such that the faulty component, circuit, or connection may be selected from a fault topology view 302 or the vehicle information panel 200.

In some examples, the fault database 240 includes faults, circuits, connections, or any combination thereof associated with the vehicle 10. In these examples, the diagnostic program 110 may access the fault database 240 to directly compare the detected fault 14, 14b of the detected fault list 222 corresponding to the detected fault selection input 223 to a fault, a circuit, or a connection associated with the vehicle 10. In other examples, there may be a separate database for faults, circuits, and/or connections such that the diagnostic program 110 may, depending on the detected fault 14, 14b, compare the detected fault 14, 14b to individual databases corresponding to faults, circuit, and/or connections of the vehicle 10.

Additionally or alternatively, the network analyzer as the vehicle interface 20 may be used in conjunction with the verification list 232. In some examples, the diagnostic program 110 is configured to filter the verification list 232 according to the measurement of the network analyzer. For example, the measurement of the network analyzer may pinpoint an increased probability that the detected fault 14, 14b is near a particular detected fault connection 14, $14b_1$ or a particular detected fault component 14, $14b_2$ of the verification list 232. The diagnostic program may receive the measurement of the network analyzer, compare the measurement of the network analyzer to the verification list 232, and eliminate or remove one or more options of detected fault connections 14, $14b_1$ or detected fault components 14, $14b_2$ from the verification list 232. In some implementations, the diagnostic program 110 is configured to incorporate the measurement of the network analyzer into the fault frequency 226 of fault database 240 to display the verification list 232. The diagnostic program 110 may include a fault probability algorithm that corresponds to at least one of the fault frequencies of the fault database 240, the measurement of the network analyzer, and a positional location of each detected fault connection 14, $14b_1$ or each detected fault component 14, $14b_2$ of the verification list 232.

Figure 2B:
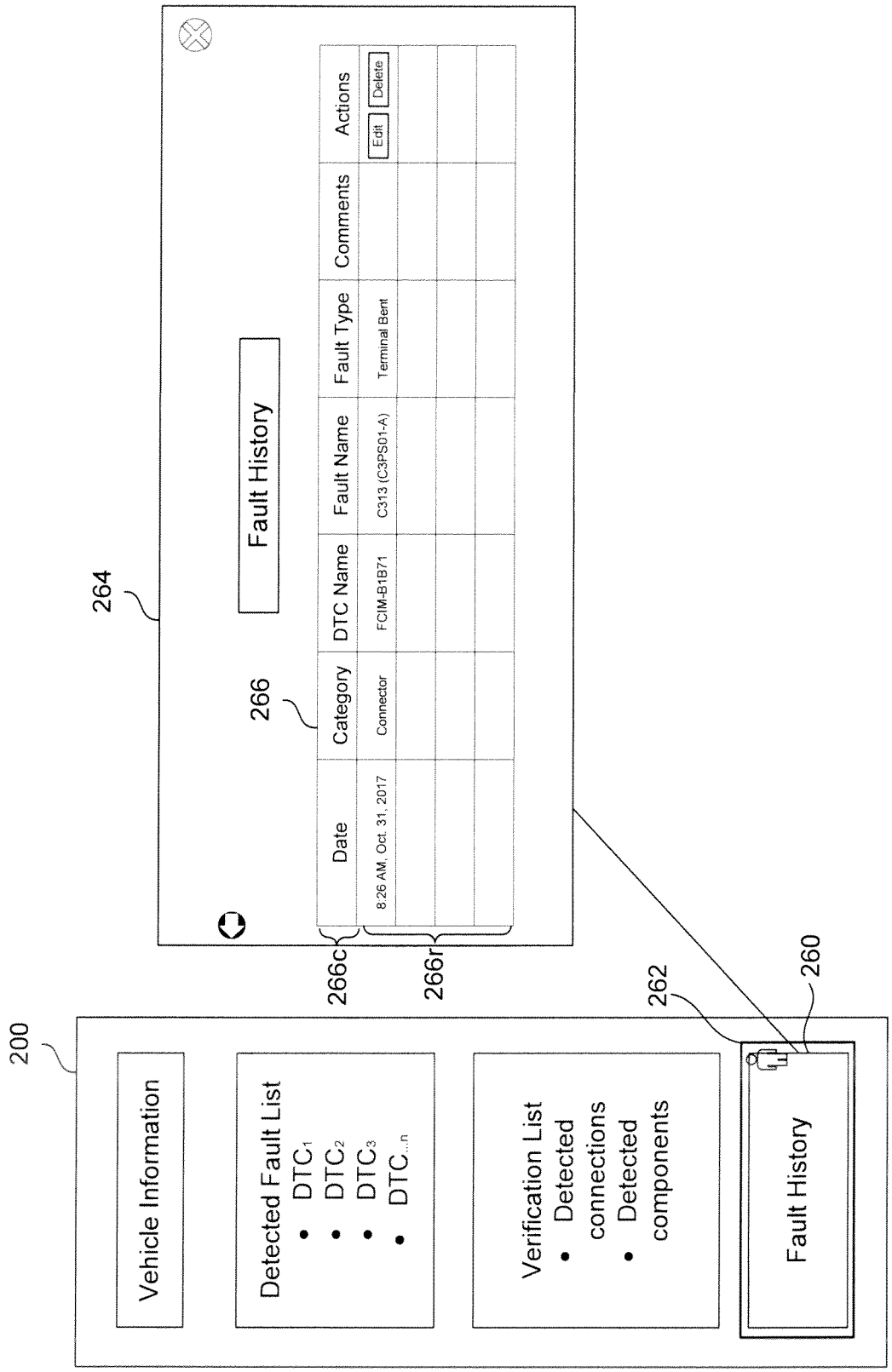
FIG. 2B is a schematic view of an example of a graphical user interface including a fault history.

In some examples, the fault history section 260 includes a list of prior faults corresponding to the vehicle 10 (e.g., the VIN 14, 14a). The fault history section 260 may display this list of prior faults within the vehicle information panel 200 or the graphic user interface 120 may receive a fault history section selection 262 that displays a fault history window 264. The fault history window 264 may be a new window or pop-up window within the fault topology window 122. FIG. 2B is an example of a fault history window 264. In this example, the fault history window 264 displays a fault history corresponding to the vehicle 10 according to a table 266. The table 266 generally includes rows 266r and columns 266c corresponding to the fault history of the vehicle 10. For example, in FIG. 2B, each row 266r corresponds to a fault occurrence. Each fault occurrence may include a corresponding date, category (e.g., connector, component, etc.), DTC name, fault name, fault type, comments/notes section, an edit function, or a delete function. In some implementations, to edit or to delete information related to a fault occurrence requires authorization such that the graphic user interface 120 may request authorization credentials prior to either function. Additionally or alternatively, the fault history window 264 includes selection buttons to return to other portions of the graphic user interface 120.

Figure 3A:
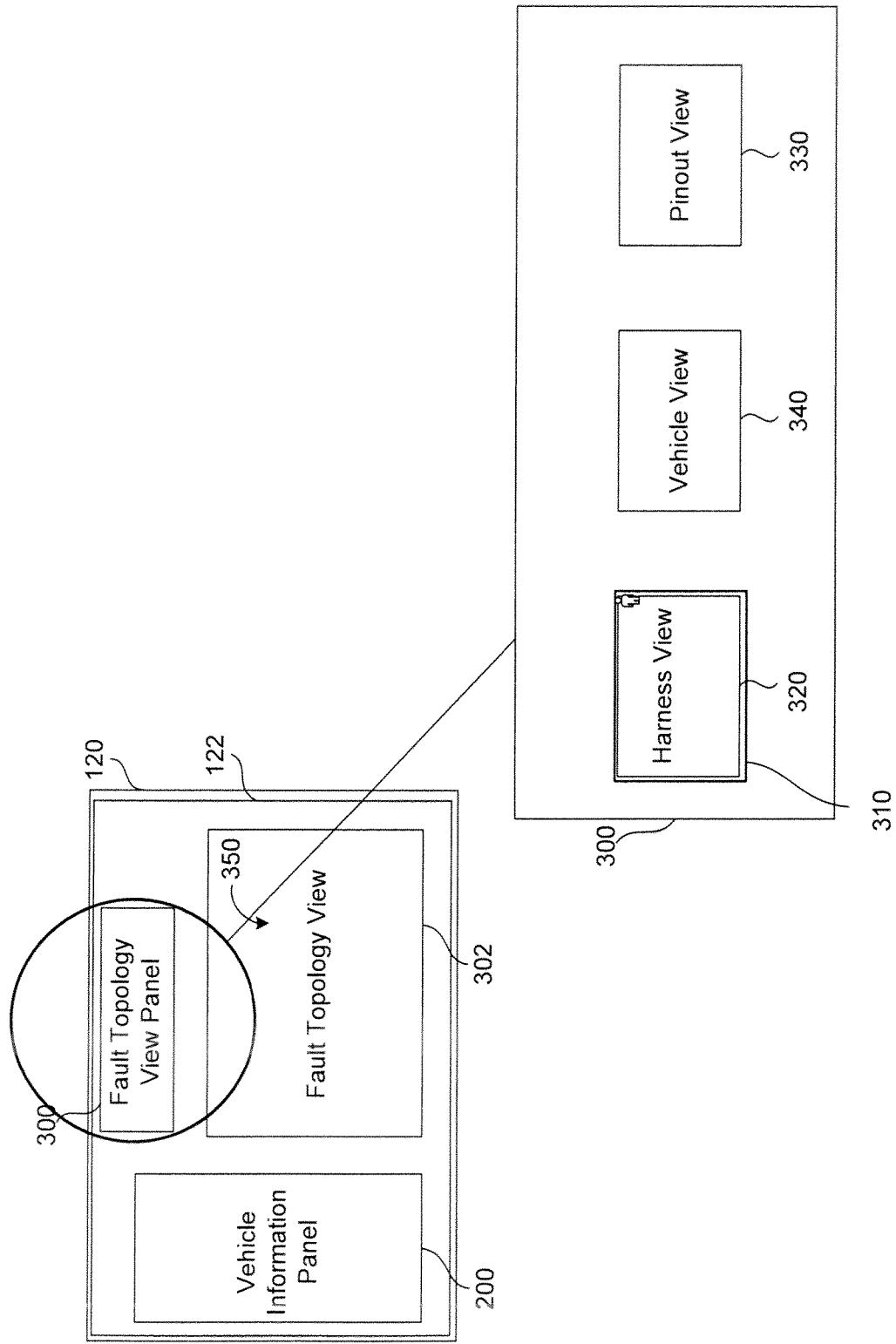
FIG. 3A is a schematic view of an example of a graphical user interface including a fault topology view panel.

FIG. 3A is an example of the fault topology window 122 of the graphical user interface 120. The fault topology window 122 includes the fault topology view panel 300 and at least one fault topology view 302. In some implementations, the graphical user interface 120 includes more than one fault topology view 302. FIGS. 3B-E depict examples of more than one fault topology view 302 for the graphical user interface 120, such a harness topology view 302, 302b, a pinout topology view 302, 302c, a vehicle topology view 302, 302d, and a circuit diagram view 302, 302e, but the graphical user interface 120 may include any combination of fault topology views 302 or any other arrangement of at least one of the detected fault connections 14, $14b_1$ or the detected fault components 14, $14b_2$ related to the detected fault 14, 14b. Each fault topology view 302 within the fault topology window 122 of the graphical user interface 120 may be selected in the fault topology view panel 300. A fault topology view selection 310 causes the diagnostic program 110 to display, in the fault topology window 122, the fault topology view 302 associated with the fault topology view selection 310.

Figure 3B:
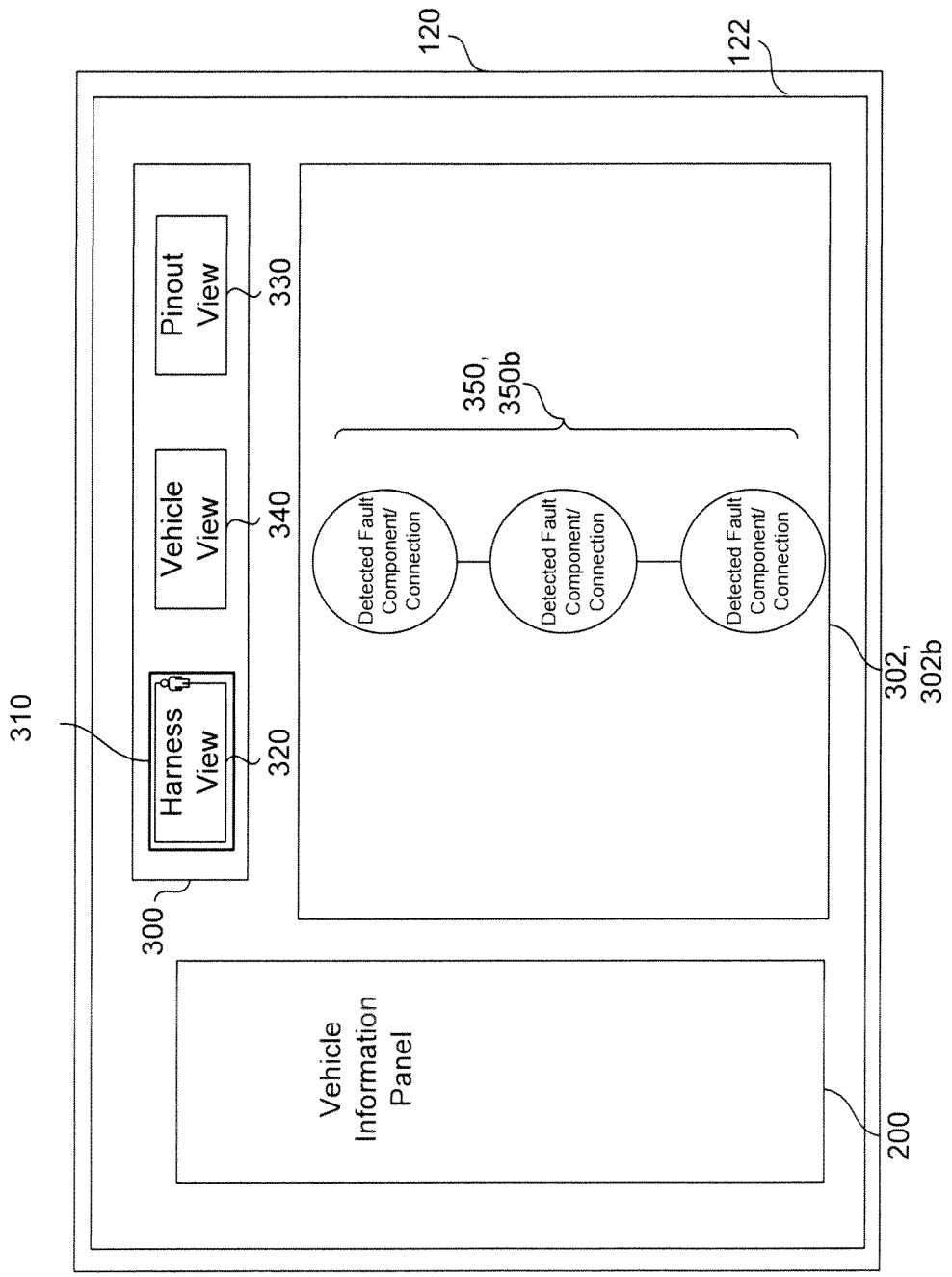
FIG. 3B is a schematic view of an example of a graphical user interface including a harness topology view.
Figure 3C:
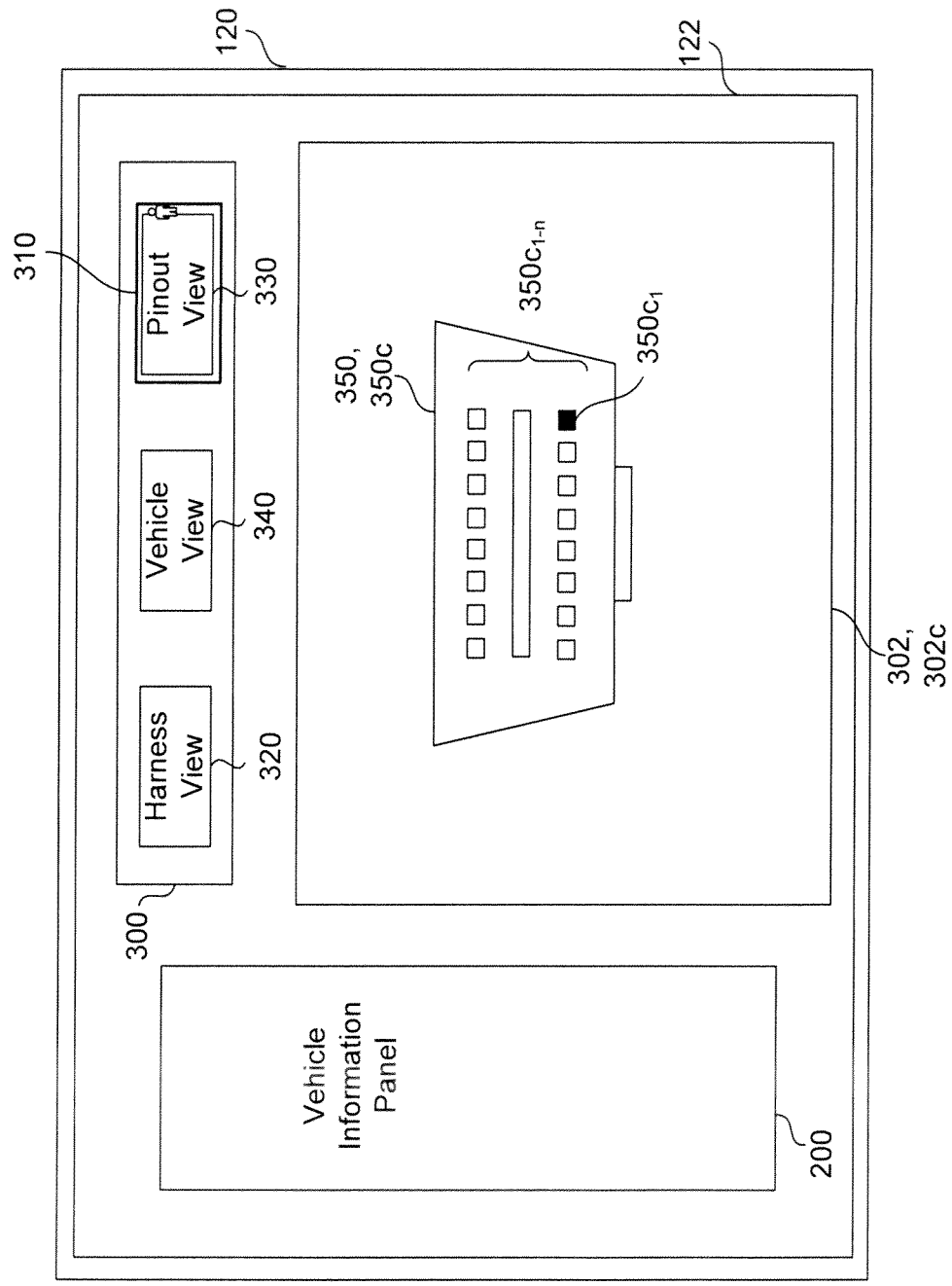
FIG. 3C is a schematic view of an example of a graphical user interface including a pinout topology view.
Figure 3D:
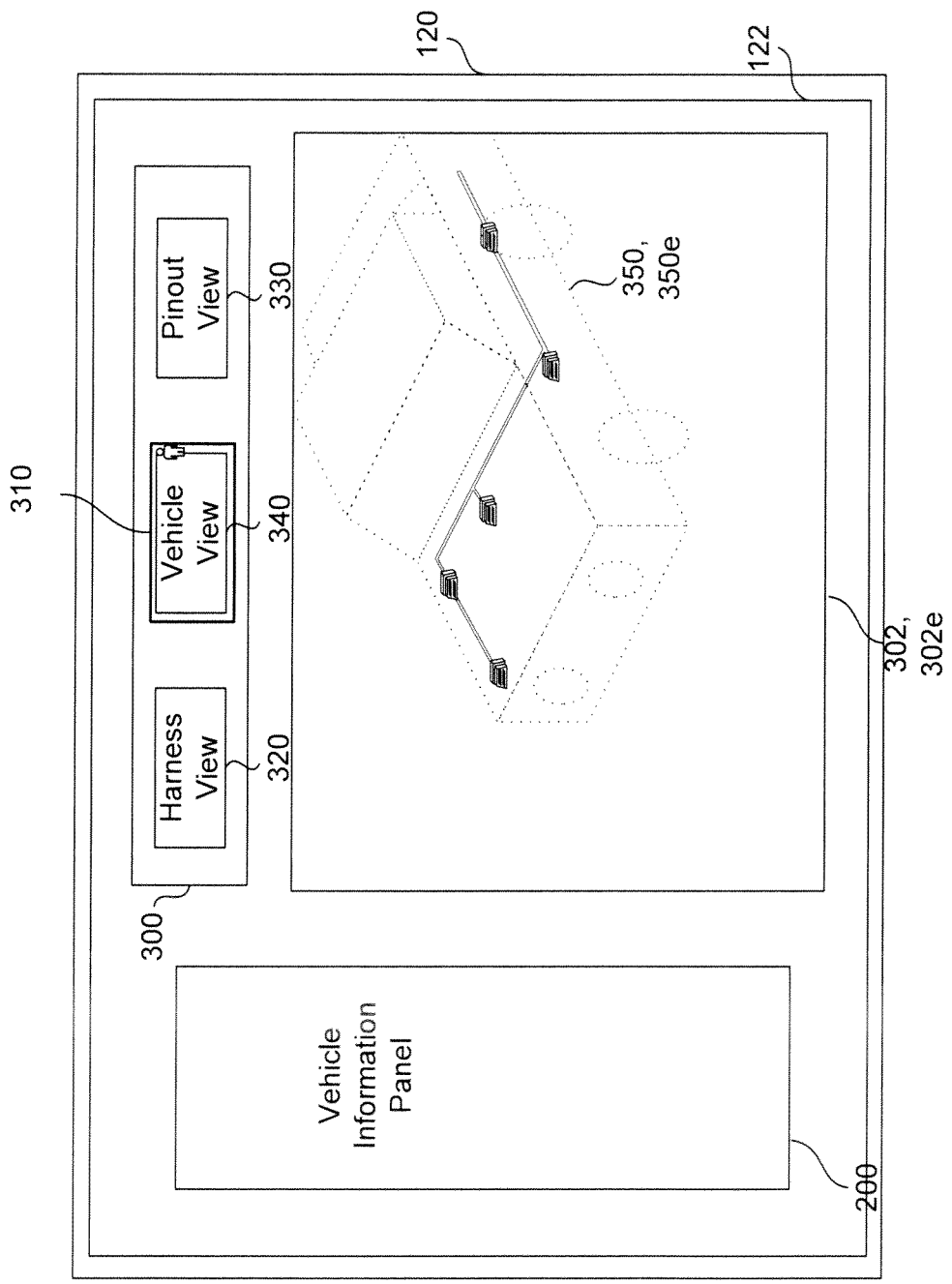
FIG. 3D is a schematic view of an example of a graphical user interface including a vehicle topology view.

As illustrated in FIG. 3D, the fault topology view 302 is a graphical representation 350 of at least one of the detected fault connections 14, $14b_1$ or the detected fault components 14, $14b_2$ of at least one detected fault 14, 14b corresponding to the detected fault selection input 224. The diagnostic program 110 is configured to render the graphical representation 350 for the fault topology view 302 by identifying the detected fault connections 14, $14b_1$ and the detected fault components 14, $14b_2$ of at least one detected fault 14, 14b. The diagnostic program 110 may identify the detected fault connections 14, $14b_1$ and the detected fault components 14, $14b_2$ of at least one detected fault 14, 14b from the fault database 240, another database within the diagnostic program 110 dedicated to the graphical representation 350 of the fault topology view 302, a database associated with the test configuration program 30, a database on a server accessed by a network, or any other database capable of communicating with the diagnostic program 110 that includes the detected fault connections 14, $14b_1$ and the detected fault components 14, $14b_2$ of at least one detected fault 14, 14b. In some examples, the graphical representation 350 displays a virtual reality format corresponding to the vehicle 10. An advantage of a virtual reality format is that the diagnostician may navigate through the graphical representation 350 to accurately identify the detected fault connections 14, $14b_1$ or the detected fault components 14, $14b_2$. This may make diagnostics and repair more efficient and even more effective for vehicle owners.

Referring back FIG. 3A, in some examples, the fault topology view panel 300 includes a selection button for the fault topology view selection 310. Each fault topology view 302 has a corresponding selection button. FIG. 3A is an example with three selection buttons: a harness view 320, a pinout view 330, and a vehicle view 340. The three selection buttons of FIG. 3A correspond to the fault topology views 302, 302b-d. Although FIG. 3A depicts three selections, the diagnostic program 110 may be configured to display any number of fault topology views 302 that represent an arrangement of at least one of the detected fault connections 14, $14b_1$ or the detected fault components 14, $14b_2$ related to the detected fault 14, 14b.

FIG. 3B is an example of the fault topology view 302 displayed by the diagnostic program 110. The fault topology view 302 displayed by the diagnostic program in the example of FIG. 3B is the harness topology view 302, 302b. The harness topology view 302, 302b is displayed by the diagnostic program 110 upon a selection therefor, as the fault topology view selection 310, the harness view 320 from the selection buttons within the fault topology view panel 300. The diagnostic program 110 renders the graphical representation 350, 350b of the harness topology view 302, 302b for the detected fault 14, 14b corresponding to the detected fault selection input 224. The graphical representation 350, 350b may include all detected fault connections 14, $14b_1$ or detected fault components 14, $14b_2$ of the detected fault 14, 14b or selective detected fault connections 14, $14b_1$ or selective detected fault components 14, $14b_2$. The diagnostic program 110 may selectively render the graphical representation 350, 350b according to fault frequencies of each detected fault connection 14, $14b_1$ or each detected fault component 14, $14b_2$ from the fault database 240.

FIG. 3C is an example of the fault topology view 302 displayed by the diagnostic program 110. The fault topology view 302 displayed by the diagnostic program in the example of FIG. 3C is the pinout topology view 302, 302c. The pinout topology view 302, 302c is displayed by the diagnostic program 110 upon selection therefor, as the fault topology view selection 310, the pinout view 330 from the selection buttons within the fault topology view panel 300. The diagnostic program 110 renders the graphical representation 350, 350c of the pinout topology view 302, 302c relating to the detected fault 14, 14b corresponding to the detected fault selection input 224. The graphical representation 350, 350c may correspond to a connector pinout electrical schematic of at least one of the detected fault connections 14, $14b_1$ or detected fault components 14, $14b_2$ from the verification list 232 of the vehicle information panel 200. The diagnostic program 110 may include an electrical pinout schematic database for each detected fault connection 14, $14b_1$ or detected fault component 14, $14b_2$ or the diagnostic program 110 may communicate with an external database with electrical pinout schematics to render the graphical representation 350, 350c. Additionally or alternatively, the pinout topology view 302,302c may include detailed information about each pin 350, $350c_{1-n}$ in the graphical representation 350, 350c. The detailed information about each pin may be electrical information, such as electrical connections, voltage, current, resistance, or other related electrical information. The detailed information about each pin may also include wire color, wire gage, or schematic reference designations. In some configurations, a selection of a pin 350, $350c_{1-n}$ within the graphical representation 350, 350c displays the detailed information in an alternative view or window (e.g., FIG. 3E). For example, FIG. 3C depicts a pin $350c_1$ as shaded to indicate a diagnostician has selected this pin for further information.

FIG. 3D is an example of the fault topology view 302 displayed by the diagnostic program 110. The faults topology view 302 displayed by the diagnostic program in the example of FIG. 3D is the vehicle topology view 302, 302d. The vehicle topology view 302, 302d is displayed by the diagnostic program 110 upon selection therefor, as the fault topology view selection 310, the vehicle view 340 from the selection buttons within the fault topology view panel 300. The diagnostic program 110 renders the graphical representation 350, 350d of the vehicle topology view 302, 302d for the detected fault 14, 14b corresponding to the detected fault selection input 224. The graphical representation 350, 350d may include all detected fault connections 14, $14b_1$ or detected fault components 14, $14b_2$ of the detected fault 14, 14b or selective detected fault connections 14, $14b_1$ or selective detected fault components 14, $14b_2$. The diagnostic program 110 may render the graphical representation 350, 350b selectively according to fault frequencies of each detected fault connection 14, $14b_1$ or each detected fault component 14, $14b_2$ from the fault database 240. The graphical representation 350, 350d may be an enlargement of a vehicle graphic representing a portion of the vehicle 10 with the detected fault 14, 14b selected from the detected fault list 222.

Figure 3E:
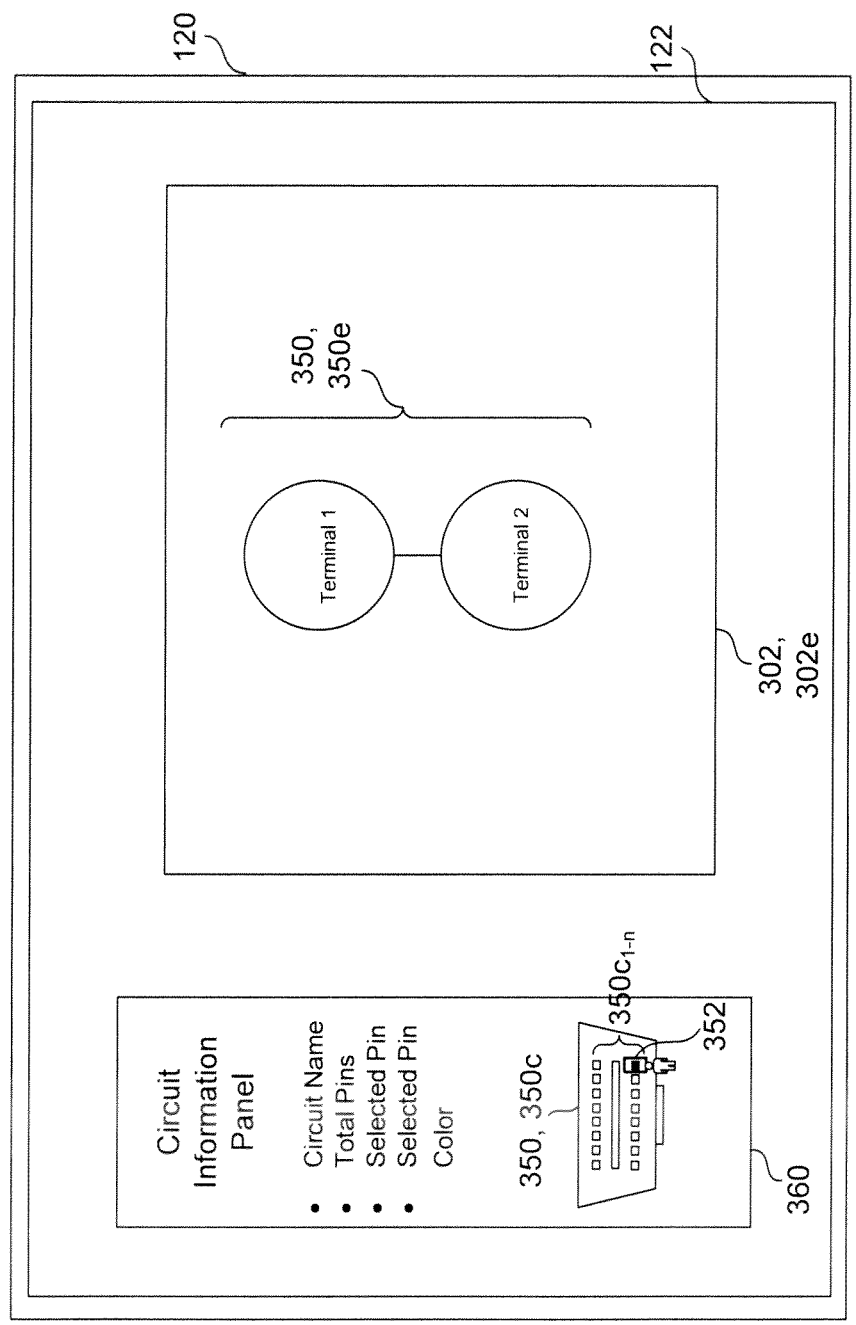
FIG. 3E is a schematic view of an example of a graphical user interface including a circuit diagram view.

FIG. 3E is an example of the circuit diagram view 302, 302e. In some examples, the circuit diagram view 302, 302e includes a graphical representation 350, 350e of terminal connections for a selected pin (e.g., pin $350c_1$ of FIG. 3C) from the pinout topology view 302, 302c. The graphical representation 350, 350e may include electrical connections such as direct vehicle connections or components, intermediary vehicle connections or components, destination vehicle connections or components, or any combination of the direct, intermediary, and destination connections and components. For example, a diagnostician makes a pin selection 352 of a pin within the graphical representation 350, 350c of the pinout topology view 302, 302c. In response to a pin selection 352 of pinout topology view 302, 302c, the graphic user interface 120 may display a circuit information panel 360 and/or the circuit diagram view 302, 302e. Here, in FIG. 3E, the selected pin of the pin selection 352 is also displayed within the circuit information panel 360 for reference to a diagnostician. The circuit information panel 360 may also include detailed information for the selected pin such as electrical information (e.g., electrical connections, voltage, current, resistance, etc.) or physical information (e.g., wire color, wire gage, or schematic reference designations). In some examples, the circuit information panel 360 includes information about both an entire circuit related to the selected pin (e.g., circuit name, total pins, etc) along with information about the selected pin (e.g., electrical information and physical information).

Figure 4:
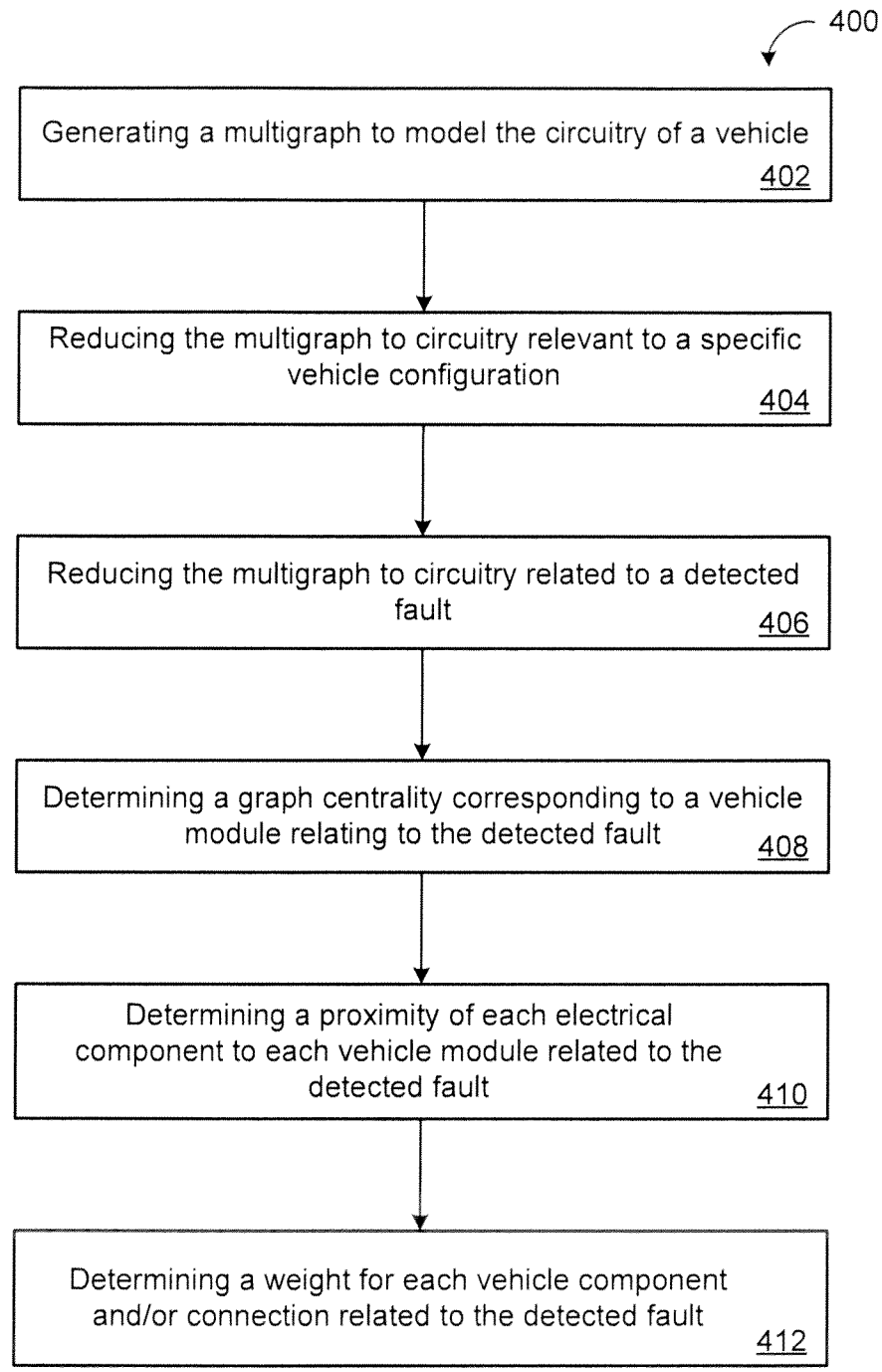
FIGS. 4 and 5 are block diagrams of example arrangements of operations performed within the diagnostic user environment.

FIG. 4 is an example arrangement of operations for a method 400 to order the verification list 232 and to determine the most likely faulty component. In some examples, the order of the verification list 232 corresponds to the fault frequency 226 as a statistical correlation assessing a likelihood that a component or connection of a vehicle 10 is responsible for a detected fault 14, 14b. For example, the statistical correlation is an algorithm determined by a data processing device in communication with the diagnostic program 110. In other examples, the data processing device is in communication with a database accessible to the diagnostic program 110.

At block 402, the method 400 generates a multigraph to model electrical circuitry of the vehicle 10. With the multigraph, at block 404, the method 400 reduces the multigraph to circuitry relevant to a specific vehicle configuration. For example, the method 400 reduces the multigraph to circuitry relevant to the vehicle configuration corresponding the VIN 14, 14a of the vehicle 10. At block 406, the method 400 reduces the multigraph further to only include circuits related to a detected fault 14, 14b (e.g., DTC, faults, or errors) associated with the vehicle 10. At block 408, the method 400 determines a graph centrality corresponding to at least one vehicle module 12, 12n related to the detected fault 14, 14b (e.g., a DTC) of the vehicle computer system 12. In some examples, the method 400 identifies the graph centrality as a weighted layer 420 (hereinafter referred to as a centrality weight 420, 420a). Some examples of centralities are degree centralities, closeness centralities, betweenness centralities, eigenvector centralities, Katz centralities, PageRank centralities, or percolation centralities. At block 410, the method 400 determines a proximity of each electrical component to each vehicle module 12, 12n related to the detected fault 14, 14b of the vehicle computer system 12. In some implementations, the method 400 identifies the proximity of each electrical component as another weighted layer 420 (hereinafter referred to as a proximity weight 420, 420b). At block 412, the method 400, based on at least one of the centrality weight 420, 420a and/or the proximity weight 420, 420b, determines a weight for each vehicle component and/or connection related to the detected fault 14, 14b. In some implementations, the method 400 determines the weight for each of the detected fault connections 14, $14b_1$ and the detected fault components 14, $14b_2$. In some examples, the verification list 232 is displayed by the graphic user interface 120 in order of the weight determined by the method 400. For example, a first item of the verification list 232 is determined by the method 400 to be most likely a root cause of the detected fault 14, 14b.

Figure 5:
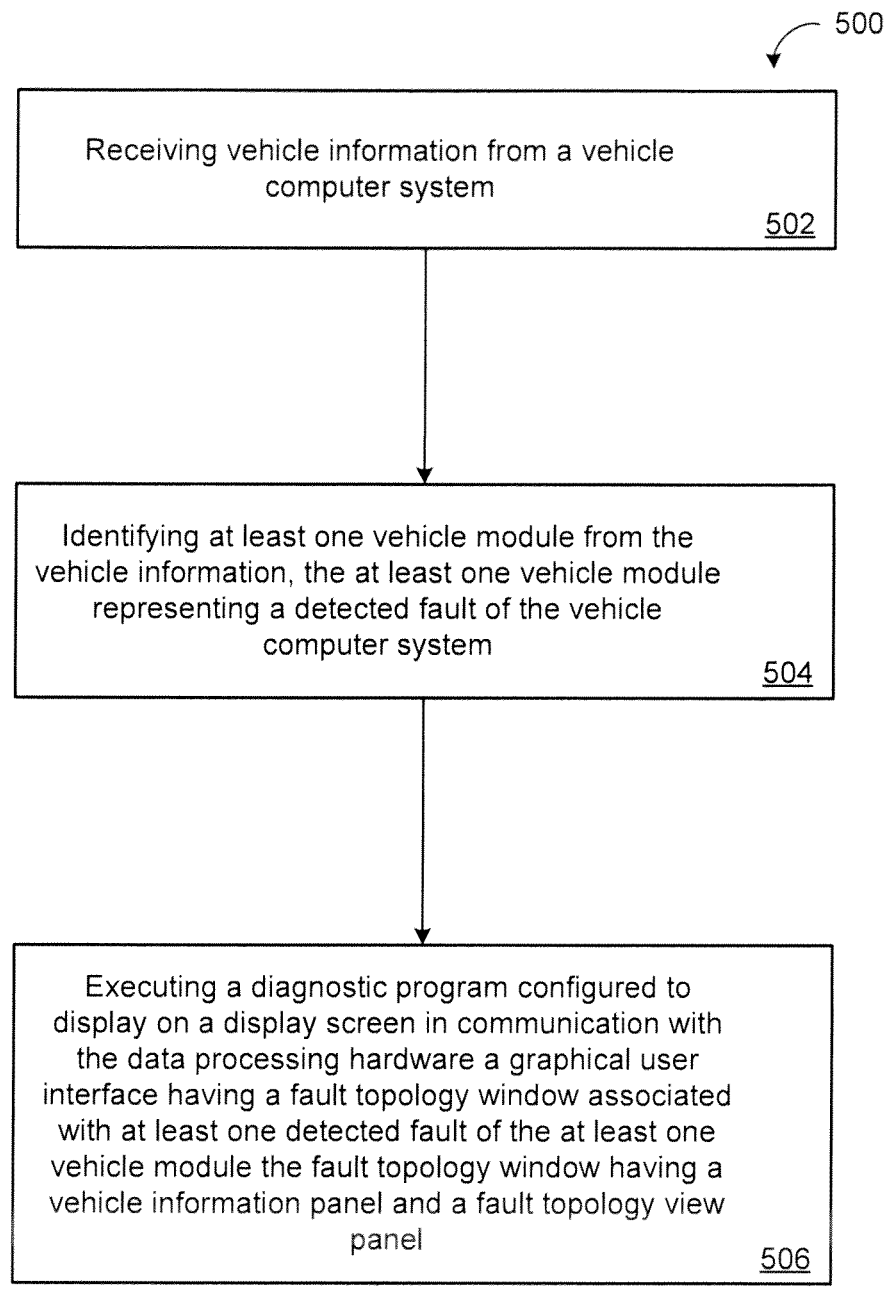

FIG. 5 provides an example arrangement of operations for a method 500 of vehicle diagnostics. At block 502, the method 500 includes receiving, at data processing hardware, vehicle information 14 from a vehicle computer system 12. At block 504, the method 500 includes identifying, at the data processing hardware, at least one vehicle module 12, 12n from the vehicle information 14. The at least one vehicle module 12, 12n represents a detected fault 14, 14b of the vehicle computer system 12. At block 506, the method 500 also includes executing, at the data processing hardware, a diagnostic program 110 configured to display on a display screen 130, in communication with the data processing hardware, a graphical user interface 120 having a fault topology window 122 associated with at least one detected fault 14, 14b of the at least one vehicle module 12, 12n. The fault topology window 122 has a vehicle information panel 200 and a fault topology view panel 300. The diagnostic program 110 is configured to receive, in the fault topology window 122, a detected fault selection input 224 of the at least one detected fault 14, 14b of the at least one vehicle module 12, 12n and display, in the graphical user interface 120, a fault topology view 302 of the at least one detected fault 14, 14b of the at least one vehicle module 12, 12n.

In some implementations, receiving vehicle information 14 from a vehicle computer system 12 includes integrating the vehicle information 14 with a test configuration program 30. The test configuration program 30 may have at least one of a collection of vehicle connections or a collection of vehicle components based on the received vehicle information 14. The fault topology view 302 may include a harness topology view 302, 302b, a pinout topology view 302, 302c, or a vehicle topology view 302, 302d.

In some examples, the diagnostic program 110 is configured to receive, in the fault topology window 122, a fault topology view selection 310 and display, in the fault topology window 122, the fault topology view 302 associated with the fault topology view selection 310. The diagnostic program 110 may be further configured to receive, in the fault topology window 122, a fault topology view selection 310, display, in the fault topology window 122, the fault topology view 302 associated with the fault topology view selection 310, and display, in the fault topology window 122, a detected fault list 222. The diagnostic program 110 may also be configured to compare the detected fault 14, 14b of the detected fault list 222 corresponding to the detected fault selection input 224 to a fault database 240, display, in the fault topology window 122, the verification list 232 of at least one of the detected fault connections 14, $14b_1$ or the detected fault components 14, $14b_2$ associated with the detected fault selection input 224, and order, in the fault topology window 122, the verification list 232 of at least one of the detected fault connections 14, $14b_1$ or the detected fault components 14, $14b_2$ by the respective fault frequency 226 of each detected fault connection 14, $14b_1$ of the collection of detected fault connections 14, $14b_1$ and each detected fault component 14, $14b_2$ of the collection of detected fault components 14, $14b_2$. The fault database 240 may include at least one of a collection of detected fault connections 14, $14b_1$ or a collection of detected fault components 14, $14b_2$. Each detected fault connection 14, $14b_1$ of the collection of detected fault connections 14, $14b_1$ and each detected fault component 14, $14b_2$ of the collection of detected fault components 14, $14b_2$ may have a fault frequency 226.

In some examples, the diagnostic program 110 is configured to display a detected fault list 222 in the graphical user interface 120. The diagnostic program 110 may also be configured to compare the detected fault 14, 14b of the detected fault list 222 corresponding to the detected fault selection input 224 to a fault database 240, display, in the fault topology window 122, a verification list 232 of at least one of the detected fault connections 14, $14b_1$ or the detected fault components 14, $14b_2$ associated with the detected fault selection input 224, and order, in the fault topology window 122, the verification list 232 of at least one of the detected fault connections 14, $14b_1$ or the detected fault components 14, $14b_2$ by the respective fault frequency 226 of each detected fault connection 14, $14b_1$ of the collection of detected fault connections 14, $14b_1$ and each detected fault component 14, $14b_2$ of the collection of detected fault components 14, $14b_2$. The fault database 240 may include at least one of a collection of detected fault connections 14, $14b_1$ or a collection of detected fault components 14, $14b_2$. Each detected fault connection 14, $14b_1$ of the collection of detected fault connections 14, $14b_1$ and each detected fault component 14, $14b_2$ of the collection of detected fault components 14, $14b_2$ may have a fault frequency 226.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 6:
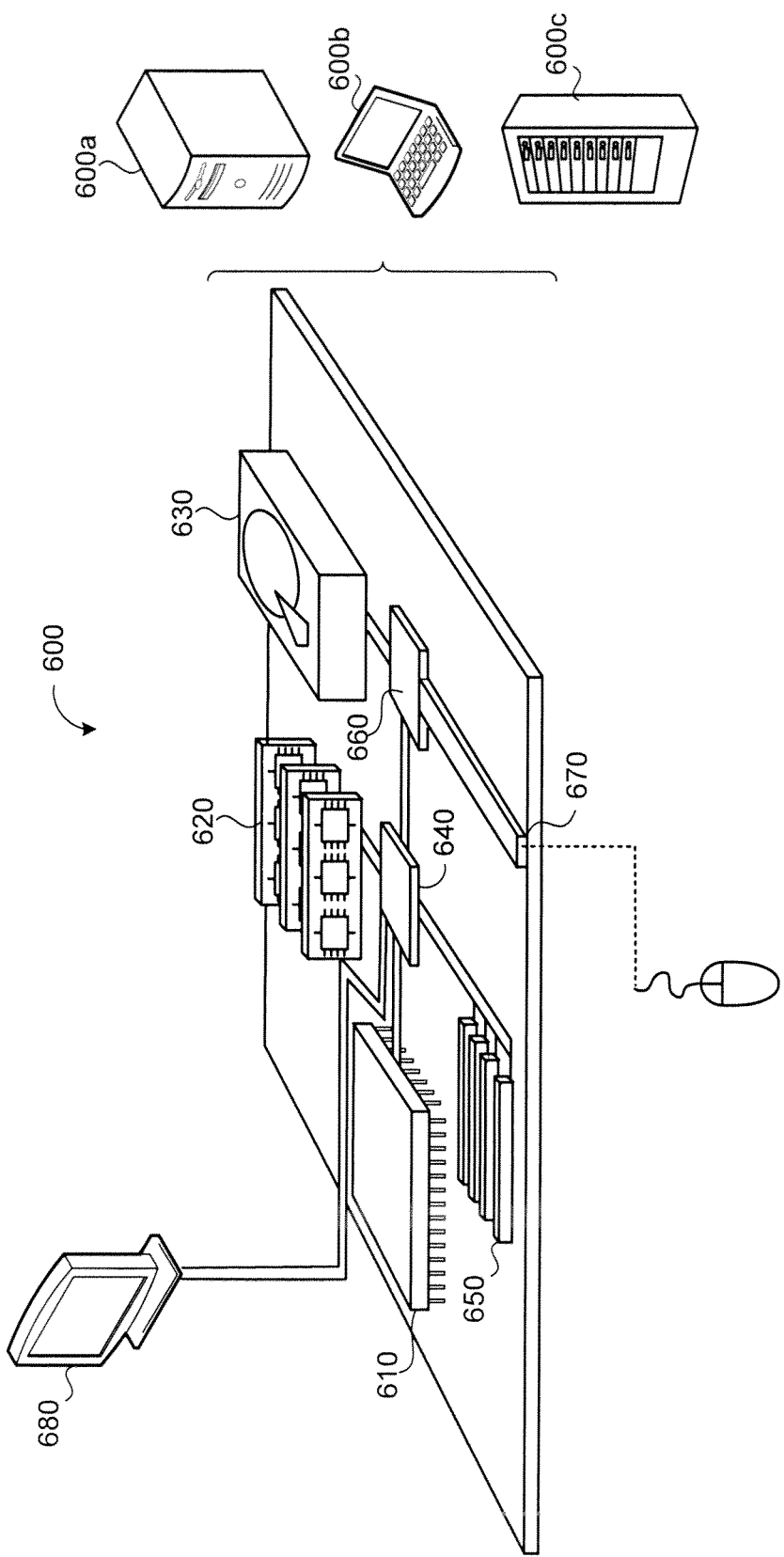
FIG. 6 is a schematic view of an example computing device that may be used to implement the systems and the methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for the graphical user interface 120 (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results. For purposes of this disclosure, the use of the conjunctions "and" and "or" follows computer logic such that the use of "or" with two elements means either one element or the other element or the inclusion of both elements. Whereas, the use of "and" means the inclusion of all elements joined by the conjunction.

What is claimed is:

1. A method for vehicle diagnostics comprising:
   receiving, at data processing hardware, vehicle information from a vehicle computer system for a vehicle;
   identifying, at the data processing hardware, at least one vehicle module from the vehicle information, the at least one vehicle module representing a detected fault of the vehicle computer system; and
   executing, at the data processing hardware, a diagnostic program configured to display on a display screen in communication with the data processing hardware a graphical user interface having a fault topology window associated with at least one detected fault of the at least one vehicle module, the fault topology window having a vehicle information panel and a fault topology view panel, wherein the diagnostic program is configured to:
     identify at least one of a collection of detected fault connections or a collection of detected fault components corresponding to the at leas one detected fault, each detected fault connection of the collection of detected fault connections and each detected fault component of the collection of detected fault components having component having a fault frequency;
     generate a multigraph as a model of circuitry for the vehicle based on the vehicle information;
     determine circuitry of the multigraph corresponding to the at least one detected fault of the vehicle computer system;
     determine, for the multigraph, a centrality weight by a graph centrality corresponding to the at least one vehicle module representing the at least one detected fault;
     determine a proximity weight for each detected fault connection and each detected fault component related to the at least one detected fault;
     identify the fault frequency as a weight based on at least one of the centrality weight or the proximity weight; and
     display, in the graphical user interface, a fault topology view of at least one of (i) the detected fault connections of the collection of detected fault connections or (ii) the detected fault components of the collection of detected fault components corresponding to the at least one detected fault of the at least one vehicle module.

2. The method of claim 1, wherein receiving the vehicle information from a vehicle computer system includes integrating the vehicle information with a test configuration program, the test configuration program having at least one of a collection of vehicle connections or a collection of vehicle components based on the received vehicle information.

3. The method of claim 1, wherein the fault topology view further comprises a harness topology view, a pinout topology view, or a vehicle topology view.

4. The method of claim 3, wherein the diagnostic program is further configured to:
   receive, in the fault topology window, a fault topology view selection; and
   display, in the fault topology window, the fault topology view associated with the fault topology view selection.

5. The method of claim 3 wherein the diagnostic program is further configured to:
   receive, in the fault topology window, a detected fault selection input of the at least one detected fault of the at least one vehicle module;
   receive, in the fault topology window, a fault topology view selection;
   display, in the fault topology window, the fault topology view associated with the fault topology view selection;
   display, in the fault topology window, a detected fault list;
   compare the detected fault of the detected fault list corresponding to the detected fault selection input to a fault database, the fault database including at least one of a collection of detected fault connections or a collection of detected fault components, each detected fault connection of the collection of detected fault connections and each detected fault component of the collection of detected fault components having the fault frequency;
   display, in the fault topology window, a verification list of at least one of the detected fault connections or the detected fault components associated with the detected fault selection input; and
   order, in the fault topology window, the verification list of at least one of the detected fault connections or detected fault components by the respective fault frequency of each detected fault connection of the collection of detected fault connections and each detected fault component of the collection of detected fault components.

6. The method of claim 1, wherein the diagnostic program is further configured to display a detected fault list in the graphical user interface.

7. The method of claim 6, wherein the diagnostic program is further configured to:
   receive, in the fault topology window, a detected fault selection input of the at least one detected fault of the at least one vehicle module;
   compare the detected fault of the detected fault list corresponding to the detected fault selection input to a fault database, the fault database including at least one of a collection of detected fault connections or a collection of detected fault components, each detected fault connection of the collection of detected fault connections and each detected fault component, the collection of detected fault components having a fault frequency;
   display, in the fault topology window, a verification list of at least one of the detected fault connections or the detected fault components associated with the detected fault selection input; and
   order, in the fault topology window, the verification list of at least one of the detected fault connections or detected fault components by the respective fault frequency of each detected fault connection of the collection of detected fault connections and each detected fault component of the collection of detected fault components.

8. A system for vehicle diagnostics comprising:
   data processing hardware; and
   memory hardware in communication with the data processing hardware, the memory hardware storing instructions that when executed on the data processing hardware cause the data processing hardware to perform operations comprising:
     receiving, at the data processing hardware, vehicle information from a vehicle computer system for a vehicle;
     identifying, at the data processing hardware, at least one vehicle module from the vehicle information, the at least one vehicle module representing a detected fault of the vehicle computer system; and executing, at the data processing hardware, a diagnostic program configured to display on a display screen in communication with the data processing hardware a graphical user interface having a fault topology window associated with at least one detected fault of the at least one vehicle module, the fault topology window having a vehicle information panel and a fault topology view panel, wherein the diagnostic program is configured to:
- identify at least one of a collection of detected fault connections or a collection of detected fault components corresponding to the at leas one detected fault, each detected fault connection of the collection of detected fault connections and each detected fault component of the collection of detected fault components having a fault frequency;
- generate a multigraph as a model of circuitry for the vehicle based on the vehicle information;
- determine circuitry of the multigraph corresponding to the at least one detected fault of the vehicle computer system;
- determine, for the multigraph, a centrality weight by a graph centrality corresponding to the at least one vehicle module representing the at least one detected fault;
- determine a proximity weight for each detected fault connection and each detected fault component related to the at least one detected fault;
- identify the fault frequency as a weight based on at least one of the centrality weight or the proximity weight; and
- display, in the graphical user interface, a fault topology view of at least one of (i) the detected fault connections of the collection of detected fault connections or (ii) the detected fault components of the collection of detected fault components corresponding to the at least one detected fault of the at least one vehicle module.

9. The system of claim 8, wherein receiving the vehicle information from the vehicle computer system includes integrating the vehicle information with a test configuration program, the test configuration program having at least one of a collection of vehicle connections or a collection of vehicle components based on the received vehicle information.

10. The system of claim 8, wherein the fault topology view further comprises a harness topology view, a pinout topology view, or a vehicle topology view.

11. The system of claim 10, wherein the diagnostic program is further configured to:
- receive, in the fault topology window, a fault topology view selection; and
- display, in the fault topology window, the fault topology view associated with the fault topology view selection.

12. The system of claim 10, wherein the diagnostic program is further configured to:
- receive, in the fault topology window a detected a fault selection input of the at least one detected fault of the at least one vehicle module;
- receive, in the fault topology window, a fault topology view selection;
- display, in the fault topology window, the fault topology view associated with the fault topology view selection;
- display, in the fault topology window, a detected fault list;
- compare the detected fault of the detected fault list corresponding to the detected fault selection input to a fault database, the fault database including at least one of a collection of detected fault connections or a collection of detected fault components, each detected fault connection of the collection of detected fault connections and each detected fault component of the collection of detected fault components having a fault frequency;
- display, in the fault topology window, a verification list of at least one of the detected fault connections or the detected fault components associated with the detected fault selection input; and
- order, in the fault topology window, the verification list of at least one of the detected fault connections or detected fault components by the respective fault frequency of each detected fault connection of the collection of detected fault connections and each detected fault component of the collection of detected fault components.

13. The system of claim 8, wherein the diagnostic program is further configured to display a detected fault list in the graphical user interface.

14. The system of claim 13, wherein the diagnostic program is further configured to
- receive, in the fault topology window, a detected fault selection input of the at least one detected fault of the at least one vehicle module,
- compare the detected fault of the detected fault list corresponding to the detected fault selection input to a fault database, the fault database including at least one of a collection of detected fault connections or a collection of detected fault components each detected fault connection of the collection of detected fault connections and each detected fault component of the collection of detected fault component having the fault frequency;
- display, in the fault topology window, a verification list of at least one of the detected fault connections or the detected fault components associated with the detected fault selection input; and
- order, in the fault topology window, the verification list of at least one of the detected fault connections or detected fault components by the respective fault frequency of each detected fault connection of the collection of detected fault connections and each detected fault component of the collection of detected fault components.

15. A user device comprising:
a display screen;
data processing hardware in communication with the display screen; and
memory hardware in communication with the data processing hardware, the memory hardware storing instructions that when executed on the data processing hardware cause the data processing hardware to perform operations comprising:
- receiving, at the data processing hardware, vehicle information from a vehicle computer system for a vehicle;
- identifying, at the data processing hardware, at least one vehicle module from the vehicle information, the at least one vehicle module representing a detected fault of the vehicle computer system; and
- executing, at the data processing hardware, a diagnostic program configured to display on the display screen in communication with the data processing hardware a graphical user interface having a fault topology window associated with at least one detected fault of the at least one vehicle module, the fault topology window having a vehicle information panel and a fault topology view panel, wherein the diagnostic program is configured to:
- identify at least one of a collection of detected fault connections or a collection of detected fault components corresponding to the at leas one detected fault, each detected fault connection of the collection of detected fault connections and each detected fault component of the collection of detected fault components having a fault frequency;
- generate a multigraph as a model of circuitry for the vehicle based on the vehicle information;
- determine circuitry of the multigraph corresponding to the at least one detected fault of the vehicle computer system;
- determine, for the multigraph, a centrality weight by a graph centrality corresponding to the at least one vehicle module representing the at least one detected fault;
- determine a proximity weight for each detected fault connection and each detected fault component related to the at least one detected fault;
- identify the fault frequency as a weight based on at least one of the centrality weight or the proximity weight; and
- display, in the graphical user interface, a fault topology view of the at least one detected fault of the at least one vehicle module.

16. The user device of claim 15 wherein receiving the vehicle information from the vehicle computer system includes integrating the vehicle information with a test configuration program, the test configuration program having at least one of a collection of vehicle connections or a collection of vehicle components based on the received vehicle information.

17. The user device of claim 15 wherein the fault topology view further comprises a harness topology view, a pinout topology view, or a vehicle topology view.

18. The user device of claim 17 wherein the diagnostic program is further configured to:
- receive, in the fault topology window, a fault topology view selection; and
- display, in the fault topology window, the fault topology view associated with the fault topology view selection.

19. The user device of claim 15 wherein the diagnostic program is further configured to display a detected fault list in the graphical user interface.

20. The user device of claim 19 wherein the diagnostic program is further configured to:
- receive, in the fault topology window, a detected fault selection input of the at least one detected fault of the at least one vehicle module;
- compare the detected fault of the detected fault list corresponding to the detected fault selection input to a fault database, the fault database including at least one of a collection of detected fault connections or a collection of detected fault components, each detected fault connection of the collection of detected fault connections and each detected fault component of the collection of detected fault components having a fault frequency;
- display, in the fault topology window, a verification list of at least one of the detected fault connections or the detected fault components associated with the detected fault selection input; and
- order, in the fault topology window, the verification list of at least one of the detected fault connections or detected fault components by the respective fault frequency of each detected fault connection of the collection of detected fault connections and each detected fault component of the collection of detected fault components.

* * * * *

UNITED STATES PATENT AND TRADEMARK OFFICE
CERTIFICATE OF CORRECTION

PATENT NO. : 11,321,973 B2  
APPLICATION NO. : 16/480225  
DATED : May 3, 2022  
INVENTOR(S) : Sergio Zaccherini et al.

Page 1 of 1

It is certified that error appears in the above-identified patent and that said Letters Patent is hereby corrected as shown below:

In the Claims

At Column 19, Claim number 1, Line number 25, delete "leas" and insert --least--.

At Column 21, Claim number 8, Line number 14, delete "leas" and insert --least--.

At Column 21, Claim number 12, Line number 60, delete the second occurrence of "a".

At Column 23, Claim number 15, Line number 7, delete "leas" and insert --least--.

Signed and Sealed this  
First Day of November, 2022

Katherine Kelly Vidal  
*Director of the United States Patent and Trademark Office*